US010182116B2

(12) United States Patent
Sankaran et al.

(10) Patent No.: US 10,182,116 B2
(45) Date of Patent: Jan. 15, 2019

(54) CONTACTLESS COMMUNICATION FOR BATTERY INFORMATION

(71) Applicant: Texas Instruments Incorporated, Dallas, TX (US)

(72) Inventors: Swaminathan Sankaran, Allen, TX (US); Baher Haroun, Allen, TX (US); Srinath M. Ramaswamy, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 4 days.

(21) Appl. No.: 15/380,487

(22) Filed: Dec. 15, 2016

(65) Prior Publication Data

US 2017/0331897 A1    Nov. 16, 2017

Related U.S. Application Data

(60) Provisional application No. 62/334,127, filed on May 10, 2016.

(51) Int. Cl.
*H04L 29/08* (2006.01)
*H04B 5/00* (2006.01)

(52) U.S. Cl.
CPC .......... *H04L 67/12* (2013.01); *H04B 5/0031* (2013.01)

(58) Field of Classification Search
CPC .............................. H04L 67/12; H04B 5/0031
See application file for complete search history.

(56) References Cited

U.S. PATENT DOCUMENTS

| 5,487,184 | A  | * | 1/1996  | Nagode ................ | H01P 5/187 333/116 |
|-----------|----|---|---------|------------------------|--------------------|
| 5,530,922 | A  | * | 6/1996  | Nagode ................ | H03G 3/3042 330/129 |
| 8,463,472 | B2 | * | 6/2013  | Watanabe ............. | G07C 5/085 320/109 |
| 8,525,370 | B2 | * | 9/2013  | Walley .................. | H02J 5/005 307/104 |
| 8,798,832 | B2 | * | 8/2014  | Kawahara ............ | H01M 10/441 701/22 |
| 9,728,985 | B2 | * | 8/2017  | Honda .................. | H02J 7/0027 |
| 2009/0212781 | A1 | * | 8/2009  | Bertness ............... | G06Q 99/00 324/426 |
| 2013/0231854 | A1 | * | 9/2013  | Rovik ................. | B60R 16/0236 701/123 |
| 2013/0295434 | A1 | * | 11/2013 | Ayub .................. | H01M 2/1061 429/157 |
| 2015/0195900 | A1 | * | 7/2015  | Wakabayashi ........ | H01P 3/081 361/752 |

(Continued)

*Primary Examiner* — Lewis West
(74) *Attorney, Agent, or Firm* — Michael A. Davis, Jr.; Charles A. Brill; Frank D. Cimino

(57) ABSTRACT

One example includes a system is comprised of an elongated transmission line and as module. The elongated transmission line includes an arrangement of transmission line couplers distributed along its length at spaced apart locations. The module has an outer surface and is comprised of a transmitter, and a transmitter coupler. The transmitter transmits a radio frequency signal. The transmitter coupler is on the outer surface of the module, electrically connects with the transmitter, and aligns to couple with a respective one of the transmission line couplers to provide a contactless communication link between the transmitter and the elongated transmission line.

14 Claims, 5 Drawing Sheets

(56) References Cited

U.S. PATENT DOCUMENTS

2015/0293178 A1\* 10/2015 Fujii .................... G01R 31/362
324/434
2016/0006085 A1\* 1/2016 Toya .................... H01M 10/48
429/90

\* cited by examiner

CONTACTLESS COMMUNICATION FOR BATTERY INFORMATION

CROSS-REFERENCE TO RELATED APPLICATION

This application claims priority under 35 U.S.C. 119 to U.S. Provisional Patent Application 62/334,127, filed on May 10, 2016, and entitled NEAR-FIELD CONTACTLESS COMMUNICATION SYSTEM WITH CONFIGURABLE ADD/DROP ACCESS POINTS IN A BATTERY MODULE SYSTEM, the entirety of which is incorporated by reference herein.

TECHNICAL FIELD

This disclosure relates generally to communications and, more particularly, to contactless communications for battery information.

BACKGROUND

Electric and hybrid vehicles as well as other machines utilize battery modules. Such machines may utilize a plurality of these battery modules that, taken in aggregate, constitute a battery pack. Individual battery modules typically include multiple batteries. These battery modules may be subject to extreme operating conditions, including operating in extreme heat during warm weather conditions and operating in extreme cold during cold weather conditions. Battery modules are also subject to charge and discharge cycles that produce heat within the battery modules that are a result of chemical reactions that take place therein. A lifespan of the battery pack can include thousands of cycles of charging and discharging the battery modules.

SUMMARY

One example including a system is comprised of an elongated transmission line and as module. The elongated transmission line includes an arrangement of transmission line couplers distributed along its length at spaced apart locations. The module has an outer surface and is comprised of a transmitter, and a transmitter coupler. The transmitter transmits a radio frequency signal. The transmitter coupler is on the outer surface of the module, electrically connects with the transmitter, and aligns to couple with a respective one of the transmission line couplers to provide a contactless communication link between the transmitter and the elongated transmission line.

Another example includes a method of communicating battery information, comprising positioning an elongated transmission line along a surface of a module to align a given transmission line coupler with a transmitter coupler disposed on the surface of the module, the transmission line including an arrangement of transmission line couplers, including the given transmission line coupler, distributed along its length at spaced apart locations, the module including a battery and a transmitter, the transmitter being electrically connected to the transmitter coupler; establishing a communication link between the transmitter and the elongated transmission line via a contactless link formed by the alignment of the transmission line coupler and the transmitter coupler; and transmitting information associated with the battery from the transmitter via the established communications link.

Another example includes another system comprising an elongated transmission line, a module, a host module, a battery, and a detector. The elongated transmission line that includes an arrangement of transmission line couplers distributed along its length at spaced apart locations. The module has an outer surface and is comprised of a transmitter, and a transmitter coupler. The transmitter transmits a radio frequency signal. The transmitter coupler is on the outer surface of the module, electrically connects with the transmitter, and aligns to contactlessly couple with a respective one of the transmission line couplers to provide a contactless communication link between the transmitter and the elongated transmission line. The detector detects information associated with the battery. The transmitter receives power from the battery and is configured to transmit the information via the elongated transmission line.

DETAILED DESCRIPTION

This disclosure relates generally to communications and, more particularly, to contactless communications for battery information. For example, a communications system is disclosed to contactlessly couple one or more battery modules with a host module. The coupling system and methods disclosed herein may include an elongated transmission line and battery modules that each include a transmitter/receiver. The battery modules may contactlessly couple to the elongated transmission line via the transmitter, which in an example may facilitate communicating diagnostic information associated with the battery modules with a host module. As used herein, the term "contactless" or its derivatives refers to an absence of electrical contact between couplers such as where the couplers are spaced apart by air and/or one or more other non-electrically conductive substrates. Contactless, however, does not require the absence of any physical contact in the communications path between coupler. For example, one or more non-conductive substrate layers may physically contact each other between a pair of couplers that do not contact each other electrically yet provide for communications between the pair of couplers.

As an example, the elongated transmission line includes an arrangement of transmission line couplers distributed along its length at spaced apart locations. At least one module includes a battery; a transmitter/receiver; and a transmitter/receiver coupler aligned to contactlessly couple with a respective one of the transmission line couplers to provide a contactless communication link between the transmitter/receiver and the transmission line. A detector may detect diagnostic information associated with the battery. The host module may in turn receive diagnostic and other information associated with the battery that the transmitter transmits via the transmission line to the host module. Such contactless coupling enables diagnostic information to be communicated with the host module in a high voltage extremely noisy environment, such as a machine (e.g., a vehicle). Moreover, the host module may communicate back to each of the modules. For example, the host may allocate time slots and control information to each of the modules for protocol and handshake.

Figure 1:
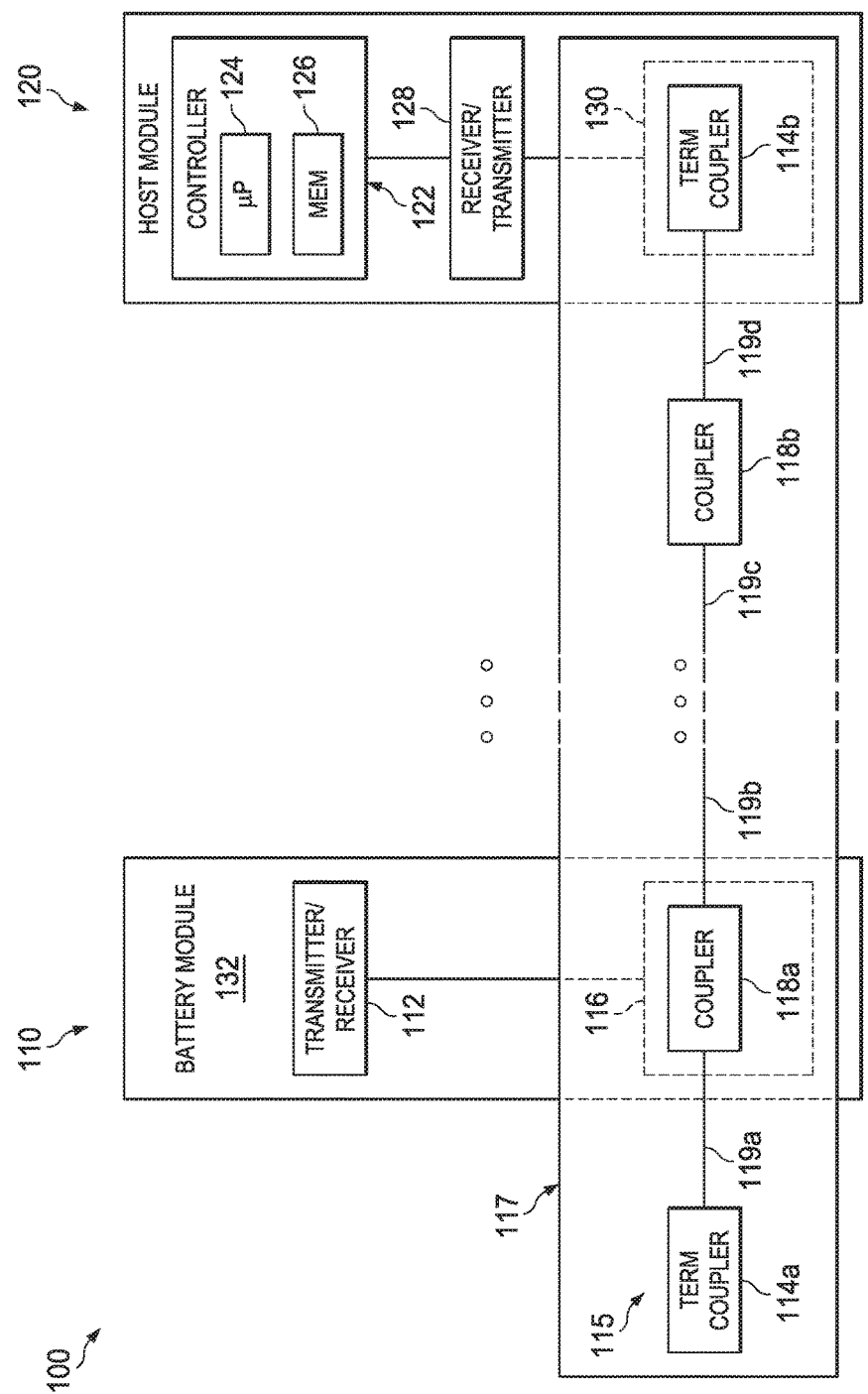
FIG. 1 illustrates an example of a system for contactlessly coupling one or more battery modules with a host module.

FIG. 1 illustrates an example of a system 100 for contactlessly coupling one or more battery modules 110 with a host module 120. The system 100 may include a battery module 110, an elongated transmission line 115, and a host module 120. The battery module 110 includes a battery module housing 132 and a transmitter/receiver 112 connected to a coupler 116. The transmitter/receiver coupler 116 is electrically connected to the transmitter/receiver 112 and is positioned on an outer surface 116 of the battery module housing 132 to provide for non-contact coupling for communicating signals to and/or from the transmitter/receiver. For example, the coupler 116 may be positioned approximately central with respect to a width of the battery module housing 132 or other location to facilitate placement of the transmission line to provide contactless coupling between the transmitter coupler and the transmission line coupler. In the example of FIG. 1, for ease of illustration and explanation, a single battery module 110 is shown. However, the system 100 can include any number of battery modules 110 to provide power for a particular application. Thus, in other examples, a plurality of such battery modules 110 may be coupled to a single elongated transmission line 115 via alignment of respective couplers, such as disclosed herein. The host module 120 includes a controller 122, the controller 122 including a microprocessor 124 and a memory 126. In an example, the transmitter/receiver 112 and receiver/transmitter 128 are implemented as transceivers to provide for bi-directional communication between the host module and each one or more battery module. In some examples, communication (unidirectional or bidirectional) may also occur between two or more battery modules via the transmission line 115.

The elongated transmission line 115 is an inter-module transmission line that includes a first termination coupler 114a electrically coupled via electrical traces to a first transmission line coupler 118a, a second transmission line coupler 118b, and a second termination coupler 114b coupled to the second transmission line coupler 118b, with electrical coupling between such components being performed with conductive traces. In between the termination coupler 114a, the first transmission line coupler 118a, the second transmission line coupler 118b, and the second termination coupler 114b are conductors 119a, 119b, 119c, and 119d, respectively. The distance between any two of the first termination coupler 114a, the first transmission line coupler 118a, the second transmission line coupler 118b, and the second termination coupler 114b may be approximately equal, allowing the coupler 118b to be coaxially and superimposedly aligned with the transmitter/receiver coupler 116 and, likewise, the first termination coupler 114a to be coaxially and superimposedly aligned with the receiver/transmitter coupler 130. The location of the couplers may be predetermined or configurable to facilitate alignment of transmission line couplers with respective transmitter couplers. As an example, the first transmission line coupler 118a and second termination coupler 114b are coaxially and superimposedly aligned with the transmitter/receiver coupler 116 and the receiver/transmitter coupler 130, respectively. Such physical arrangement between such couplers enables such respective components to establish near-field contactless communications therebetween. Such near-field contactless communications allow the battery module 110 to establish communications with the host module 120 in a high voltage extremely noisy environment, such as an automobile, that conventionally prevents communications between such components.

For simplicity of illustration and explanation, a single battery module 110 is shown. However, the system 100 can include any number of battery modules 110 that are needed to provide power for a particular application, with a plurality of these battery modules 110 being coupled to a single elongated transmission line 115. For example, the second transmission line coupler 118b can be used to establish contactless communication with another battery module 110 (not shown).

In one example, the elongated transmission line 115 may include electrical traces mounted with a flexible or semi-flexible substrate 117, such as an inexpensive flexible printed circuit board. In another example, the elongated transmission line 115 may be constructed of, for example, copper (Cu) and/or iron (Fe) traces, such as disposed on a sheet of the flexible or semi-flexible substrate (e.g., an adhesive tape or similar construction) 117. The traces can be pre-printed onto a surface of the tape that is free of adhesive (or adhesive applied after traces are disposed thereon), and which can be stored in rolls preformed strips to facilitate application to batteries. For example, the flexible or semi-flexible substrate 117 includes an adhesive on one side thereof to allow the elongated transmission line 115 to be affixed to the battery module 110 and the host module 120. Once the transmission line is attached to the battery module, the adhesive maintains alignment between each transmitter/receiver coupler 116 and each transmission line coupler 118. Similarly, the adhesive may maintain alignment among the termination coupler 114b and the receiver/transmitter coupler 130 after the flexible or semi-flexible substrate 117 of elongated transmission line 115 is initially affixed to the battery module 110 and the host module 120.

A length of the transmission line 115 may depend on transmitting power of the transmitter/receiver 112 and a sensitivity of the receiver/transmitter 128. The arrangement and configuration of electrical traces on the substrate, the thickness and material for the substrate further can be designed to facilitate contactless coupling between respective couplers.

In the example shown in FIG. 1, the first termination coupler 114a is illustrated as not being coupled to a corresponding transmitter/receiver coupler 116 or another termination coupler 114 of another transmission line 115. However, termination couplers 114a and/or 114b can be coaxially and superimposedly aligned with respective couplers of other transmission lines or other transmitters (not shown) to establish contactless communications therebetween. Such physical arrangement of couplers 114 allows for multiple elongated transmission lines 115 to be placed end-to-end in a variety of configurations to establish communications among numerous battery modules 110 and the host module 120 via one or more transmission lines. In one example, an automobile or other electromotive machine may employ tens or hundreds of such battery modules 110 in series, with each of the battery modules 110 establishing communications with the host module 120. In some examples, instead of contactless coupling at the end of the transmission line, the termination couplers 114 may be physically electrically connected, for example, with a snap connector, ribbon connector or the like, to establish hardwired electrical connection for communications between multiple transmission lines 115.

The transmitter/receiver 112 at the module and receiver/transmitter 128 may use any frequencies and communication protocols that allow the battery module 110 and the host module 120 to establish near-field contactless communications with the elongated transmission line 115. In one example the transmitter/receiver 112 and receiver/transmitter 128 may employ mmWave frequencies in a range between 100 MHz and 100 GHz. As another example, the transceivers 112 and 128 may communicate using time-division multiplexing by transmitting in assigned time slots or frequency-division multiplexing by communicating over assigned frequency subchannels.

By way of example, the host module 120 may program each of the battery modules 110 to calibrate each module to function cooperatively during normal operation. For example, following initial activation of the host module 120, the host module 120 can enter a calibration mode to poll the battery modules 110 within the system 100. Each battery module 110 within the system 100 may be assigned a unique identifier, such as a media access control (MAC) address. In one example, each battery module 110 may be assigned a time slot in which its information is transmitted to the host module 120 according to a time division access protocol. The host module 120 stores a list of unique identifiers in memory 126. The host module 120 maintains a database in memory 126 of unique identifiers for battery modules 110 within the system 100. When a particular battery module 110 transmits information to the host controller 122, the host module 120 can enter such information into the database associated with the unique identifier associated with that particular battery module 110. Such a database may be accessed by a technician, for example, via an on-board diagnostic (OBD) interface, to determine a state of one or more batteries in the battery module 110. Thus, the technician or automated controls may more easily determine the state of the batteries within the system 100, such as to reconfigure and/or replace a battery module 100 depending on its operating parameters. For instance, the information collected from the battery modules 110 can be used by host controller 122 of module 120 to selectively control operating parameters of one or more of the modules. The host module further may send an alert (e.g., a light on the battery or a message to a person or device) based on information collected from one or more battery modules to indicate that a given module is due for replacement.

Figure 2:
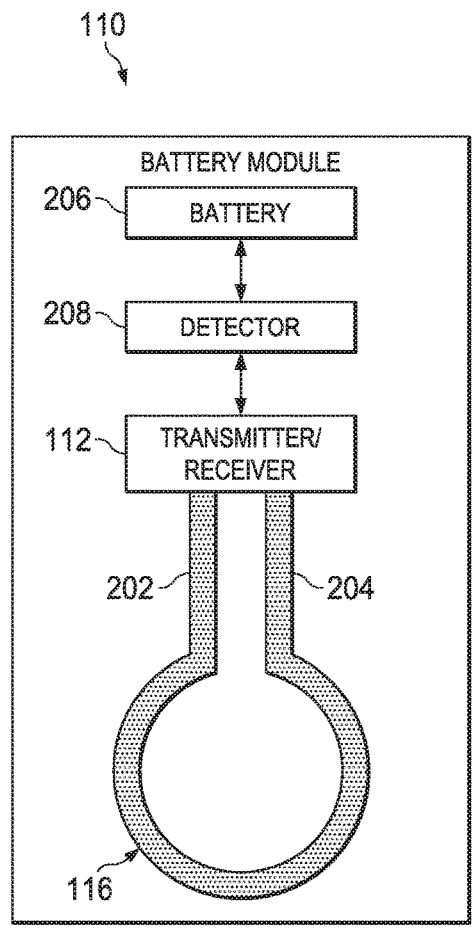
FIG. 2 illustrates an example of the battery module.

FIG. 2 illustrates an example of the battery module 110. The battery module 110 is illustrated as including one or more batteries 206 coupled to a detector 208. The detector 208 is coupled to the modules transmitter/receiver 112. The detector 208 may include one or more sensors and/or receive inputs from one or more sensors that monitor operating parameters of the battery module 110. The coupler 116 utilized by the transmitter/receiver 112 may be substantially similar to the coupler 130 utilized by the receiver/transmitter 128 at the host module. The size and shape of the coupler 116/130 is dictated by the shape and dimensions of the corresponding coupler 114/118, such as shown in FIG. 3.

Figure 3:
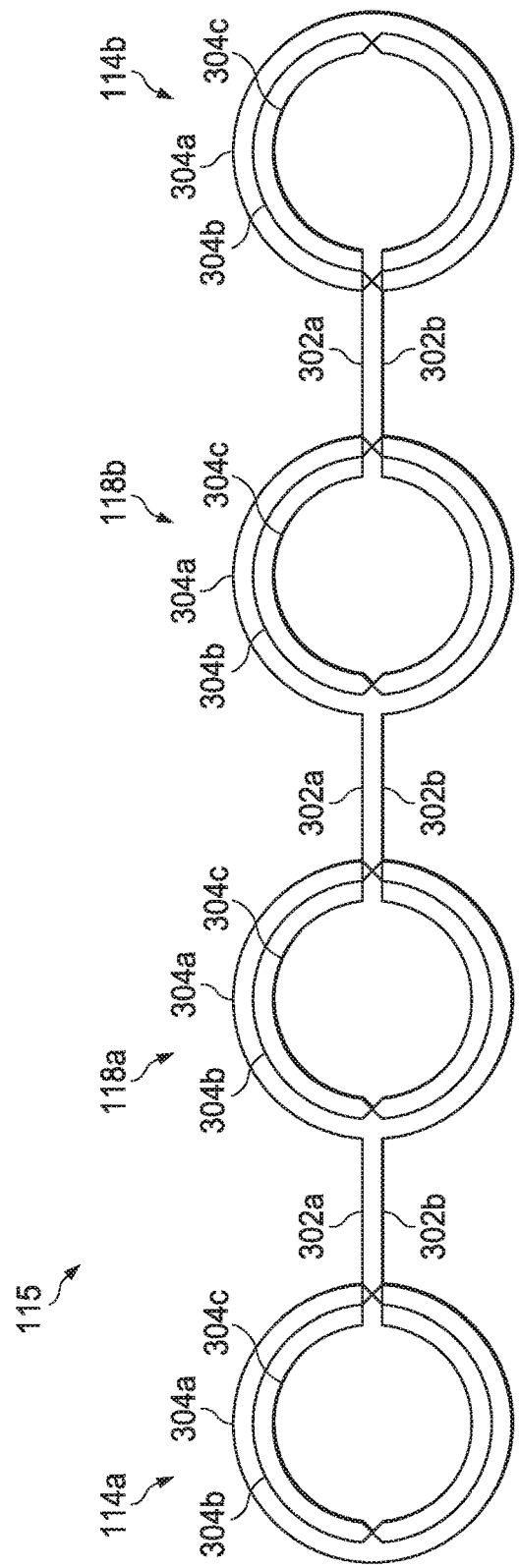
FIG. 3 illustrates an example of a transmission line.
Figure 4:
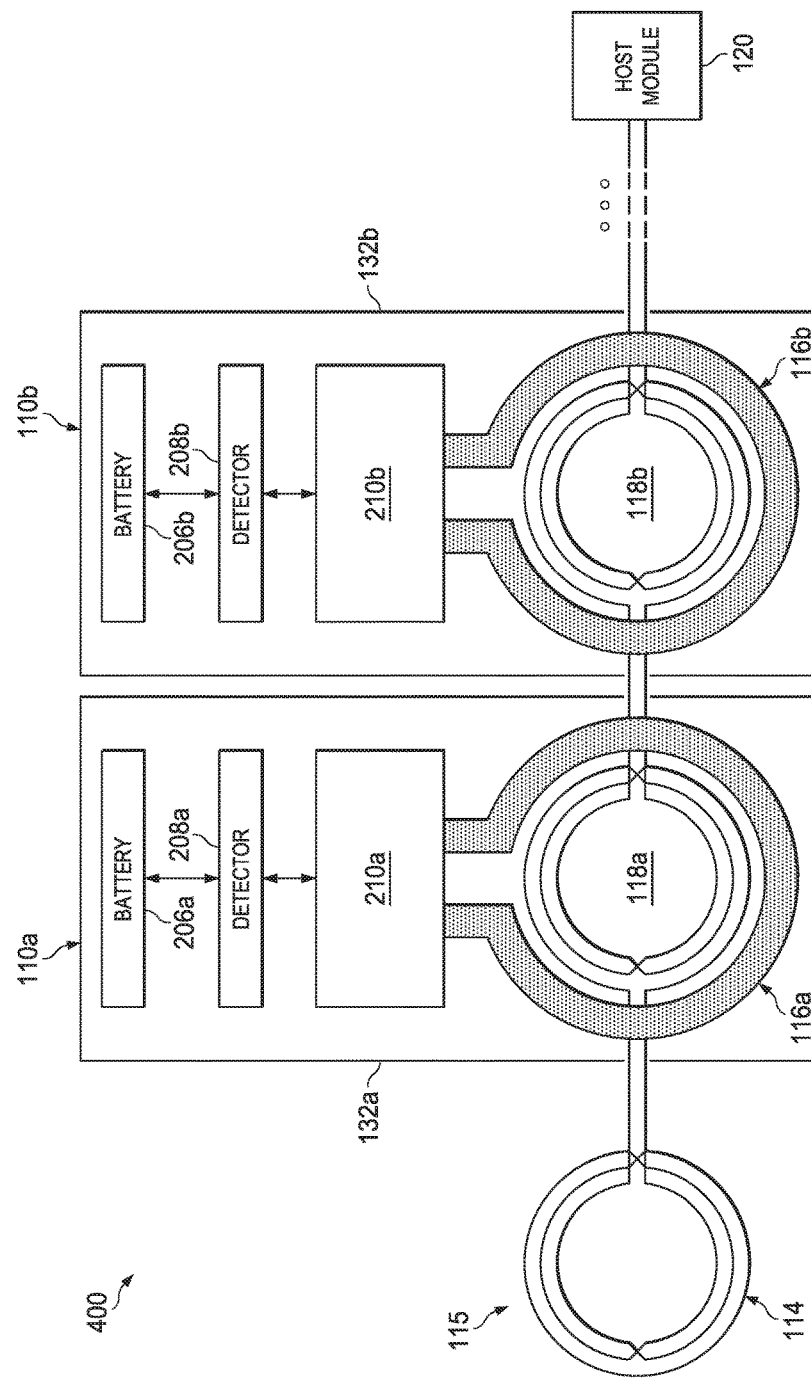
FIG. 4 illustrates an example system employing the example battery module and example transmission line shown in FIGS. 2 and 3.

In the example of FIGS. 2 and 3, the coupler 116/130 includes a circular-shaped portion (e.g., a bulbous loop) extending between two conductive arms 202 and 204. The conductive arms 202 and 204 extend from respective ends of the loop to connect to the transmitter/receiver 112/receiver/transmitter 128. However, the coupler 116/130 can be any shape that includes, for example, square, rectangular, oval, triangle, or any other shape that facilitates the coupler 116/130 with establishing near-field communications, via production of an electromagnetic field, with the corresponding coupler 114/118. Thus, the corresponding coupler 114/118 is similarly shaped. The coupler 116/130 provides a continuous electrically conductive path (e.g., wire or trace) constructed of, for example, copper (Cu)/iron (Fe) traces. In some examples, such as shown in FIG. 4, the coupler 116/130 is slightly greater in diameter that the coupler 114/118 that it coaxially and superimposedly aligns with. However, in another example, the coupler 116/130 may be slightly smaller in diameter than the coupler 114/118 that it aligns with. In yet other examples, the coupler 116/130 may be commensurate in size with coupler 114/118.

The detector 208 may include one or more sensors and/or receive inputs from one or more sensors that monitor operating parameters of the battery module 110. The detector 208 determines diagnosis information associated with the battery 206. For example, the detector 208 determines at least one of charge, pressure, and temperature of the battery 206. The detector 208 provides the diagnostic information to the transmitter/receiver 112. The transmitter/receiver 112 then transmits the diagnostic information, such as by encoding the information and modulating the encoded information, as a modulated RF signal for transmission of the information via the transmission line 115. The receiver/transmitter 128 of the host module 120 thus receives, stores and processes the diagnostic information to implement control operations, for example.

FIG. 3 illustrates an example of the transmission line 115. In the example shown, the transmission line 115 includes four couplers 114a, 118a, 118b, and 114b. However, the transmission line can be constructed with more or less couplers 114/118 dependent on the number of battery modules 110 being employed within a system 100 and/or the layout of the battery modules 110. For example, the transmission line may be configured to accommodate any the number of one or more rows and/or columns of battery modules 110. In the example shown, the transmission line 115 may be constructed of one continuous conductor wire that allows a signal placed at any point on the transmission line 115 to be available along its entire length. For example, inductive coupling between the transmitter/receiver coupler 116 and the termination coupler 114 or transmission line coupler 118 induces a voltage on the transmission line 115 that propagates from the coupler across the length of the transmission line. The couplers 114/118 are each interconnected to each other via an adjacent set of conductors 302a and 302b, such as may be implemented as electrical conductors of approximately equal length, placing the transmission line couplers 114/118 at a set interval apart. Such a set interval may be selected based on the dimensions of the battery module housing 132 and the placement of the one or more transmitter couplers 116 relative to the battery module housing 132.

The transmission line 115 is illustrated as including two couplers 118a and 118b, and two termination couplers 114a and 114b. However, as discussed above, the transmission line 115 may include more or less couplers 118 depending on the configuration of a plurality of battery modules 110. Depending upon the configuration of a plurality of battery modules 110, the couplers 118 may also be utilized as termination couplers 114. That is, in some examples, each of the couplers may be configured in a like manner such that respective couplers located at the ends of the transmission line operate as termination couplers.

The transmission line 115 is illustrated as being one continuous electrically conductive trace or wire. Each of the termination couplers 114 and couplers 118 include concentric circular wire loop, an outer loop 304a, a middle loop 304b, and an inner loop 304c. Although the termination couplers 114 and couplers 118 are illustrated as including three such concentric circular wire loops, the termination couplers 114 and couplers 118 may include more or less concentric wire loops. The number of coils/windings for each coupler, for example, may vary depending on the length of the transmission line 115, the transmission power of the transmitter/receiver 112, and/or sensitivity of receiver/transmitter 128. The inner shell 304a of the termination coupler 114a is coupled to the outer shell 304a of the first coupler 118a, via connecting conductors 302a and 302b. The inner shell 304c of the first coupler 118a is coupled to the outer shell 304a of the second coupler 118b, via connecting conductors 302a and 302b. The inner shell 304c of the second coupler 118b is coupled to the inner shell 304c of the termination coupler 114b, via connecting conductors 302a and 302b.

FIG. 4 illustrates an example system 400 employing the example battery module 402 and example transmission line 115 shown in FIGS. 2 and 3. As shown, a first battery module 110a is placed next to a second battery module 110b. The first and second battery modules 110a and 110b include an outer surface on which respective transmitter coupler are arranged in a predetermined configuration. Each of the transmitter couplers 116, for example, are arranged on the surface of the batter modules 110 to align with corresponding couplers of the transmission line 115 that is to be positioned in an overlying superimposition. In one example, the battery module housings 132a and 132b of the first and second battery modules 110a and 110b can include sidewalls that are placed against each other, physically touching each other.

The first and second couplers 118a and 118b are positioned overlying, without electrically contacting, the transmitter couplers 116a and 116b, respectively. In some examples, where the flexible or semi-flexible substrate 117 contacts the transmitter/receiver coupler 116, the contactless portion of the communications path between the transmission line 115 and the transmitter/receiver coupler 116 may be the thickness of one or two layers of the flexible or semi-flexible substrate 117 interposed between the transmitter/receiver coupler 116 and 118. The first and second couplers 118a and 118b, and the transmitter couplers 116a and 116b, are position approximately central with respect to a width of the battery module housing 132. The first and second couplers 118a and 118b are positioned approximately central with respect to a width of the transmitter couplers 116a and 116b. The first and second couplers 118a and 118b are illustrated as being positioned substantially centered within (e.g., coaxial) respect to the transmitter couplers 116a and 116b, respectively. Such positioning enables the transmitters/receivers 210a and 210b to maximize the near-field communications (e.g., via electromagnetic induction) that are established between each associate pair of the transmission line couplers 118a and 118b and the transmitter couplers 116a and 116b. For instance, each associated pair of couplers may operate as antennae, for example, employing electromagnetic induction for communication of information from and/or to each battery module and the host module according to an associated communications protocol.

Figure 5A:
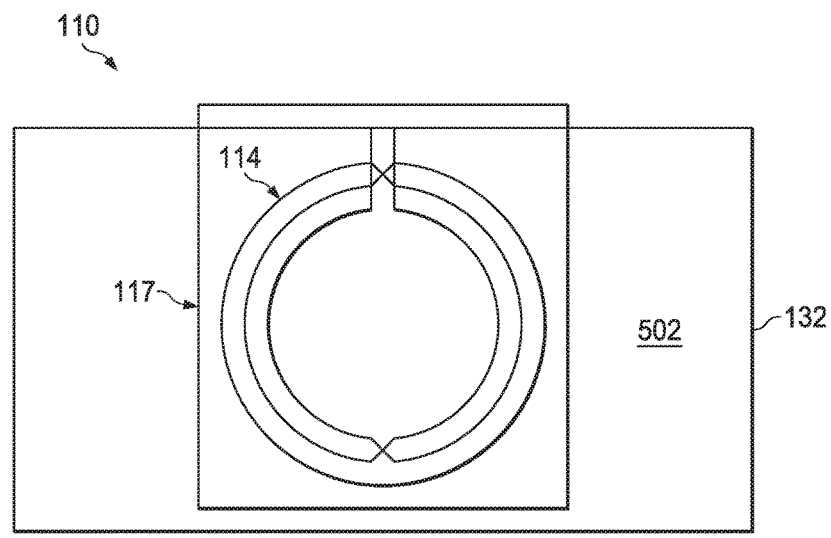
FIGS. 5A and 5B illustrate an example placement of the example transmission line on a housing of the battery module.
Figure 5B:
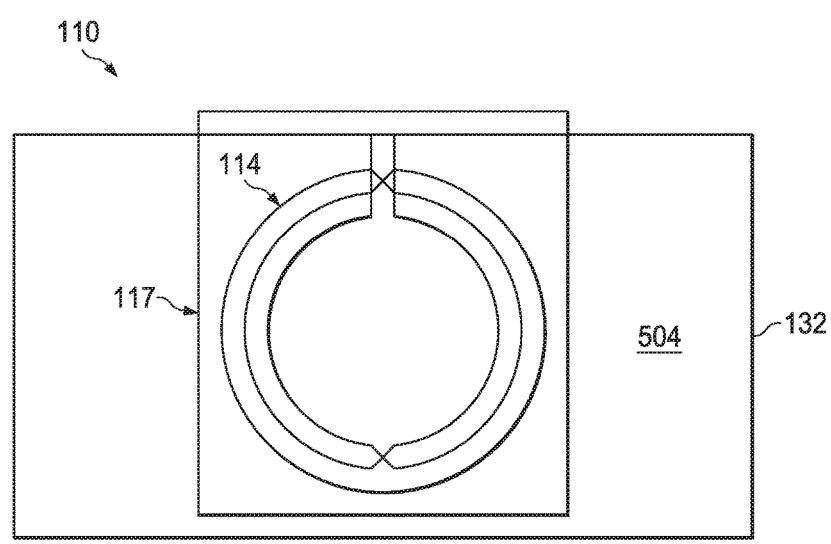

FIGS. 5A and 5B illustrate an example placement of the example transmission line 115 on the housing 132 of the battery module 110. Depending on the number of battery modules 110 within the system 400 and the length of the transmission line 115, the termination coupler 114 may extend beyond a width of the battery module housing 132 of the battery module 110. In such a configuration, the termination coupler 114 may be bent down and affixed to a side of the battery module housing 132, as shown.

FIG. 5B illustrates the termination coupler 114 affixed to a first side 502 of the battery module housing 132 and FIG. 5B illustrates the termination coupler 114 affixed to a second side 504 of the battery module housing 132. The flexible or semi-flexible substrate 117 is illustrated as extending above the top of the battery module housing 132. Such a portion of the flexible or semi-flexible substrate 117 extending above the top of the battery module housing 132 may extend and be affixed to other battery modules 110 adjacent to the battery module 110 shown. With the coupler 114 positioned as shown, multiple transmission lines 115 can be coupled together by simply positioning battery modules 110 next to, or against each other, allowing a first coupler 114 of a first transmission line 115 to align and establish communications with a second coupler 114 of a second transmission line 115 affixed likewise on an adjacent battery module housing 132. FIG. 5A and 5B illustrate termination couplers 114 on both sides of the battery module housing 132, however, depending on the configuration of the system 100/400, the battery module housing 132 would include a termination coupler 114 on a single side thereof.

In another example, the termination coupler 114 may be bent upward away from the battery module housing 132, forming an "L" shaped end on the transmission line 115 that does not contact the battery module housing 132. Two of these "L" shaped termination coupler 114 ends may be affixed to each other, for example with adhesive on the flexible or semi-flexible substrate 117, to extend a length of the transmission line 115.

Figure 6:
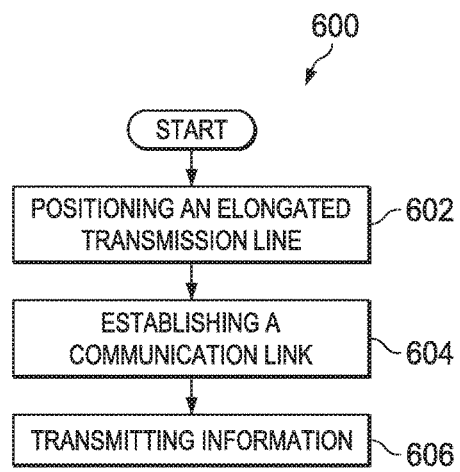
FIG. 6 illustrates an example method of communicating battery information.

In view of the foregoing structural and functional features described above, a method in accordance with various aspects of the present disclosure will be better appreciated with reference to FIG. 6. While, for purposes of simplicity of explanation, the method of FIG. 6 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure. Moreover, for simplicity of explanation, the methods of FIG. 6 can include additional functional features not discussed, with FIG. 6 being described with reference to the examples illustrated herein.

FIG. 6 illustrates an example method 600 of communicating battery information. At 602, the method 600 positions the elongated transmission line 115. The elongated transmission line 115 is positioned along a surface of the battery module 110 to align a given transmission line coupler 114/118 with a transmitter/receiver coupler 116 disposed on the surface of the battery module 110. The transmission line 115 includes an arrangement of transmission line couplers 114/118, including the given transmission line coupler 114/118, distributed along its length at spaced apart locations. The battery module 110 includes a battery 206 and a transmitter/receiver 112, with the transmitter/receiver 112 electrically connected to the transmitter coupler 114/118.

At 604, the method 600 establishes a communication link. The communication link is established between the transmitter/receiver 112 and the elongated transmission line 115 via a communications link formed by the proximity and alignment of the transmission line coupler 114/118 and the transmitter/receiver coupler 116.

At 606, the method 600 transmits information associated with the battery 206 from the transmitter/receiver 112 via the established communications link (e.g., via electromagnetic induction or other non-contact communications methods).

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A system, comprising:
    an elongated transmission line that includes: an arrangement of transmission line couplers distributed along its length at spaced apart locations; and
    a module having an outer surface, the module comprising:
        a transmitter to transmit a radio frequency signal; and
        a transmitter coupler on the outer surface of the module, the transmitter coupler electrically connected with the transmitter and aligned to couple with a respective one of the transmission line couplers to provide a contactless communication link between the transmitter and the elongated transmission line;
    the elongated transmission line further including: an elongated sheet of a flexible or semi-flexible substrate on a surface of the module; electrical traces on the elongated sheet to provide the transmission line couplers and electrical connections between adjacent pairs of the transmission line couplers; and a termination coupler adjacent an end of the elongated sheet to couple the elongated transmission line to another termination coupler of another transmission line.

2. The system according to claim 1, wherein the module further comprises:
    a battery; and
    a detector to detect information associated with the battery;
    the transmitter being arranged to receive power from the battery and to transmit the information via the elongated transmission line.

3. The system according to claim 2, wherein the information includes diagnostic information including at least one of charge, pressure, temperature and identity of the battery.

4. The system according to claim 1, wherein one of the transmission line couplers is coaxially and superimposedly aligned with the transmitter coupler residing on a surface of the module.

5. The system according to claim 1, further comprising a host module, coupled to the elongated transmission line via the other transmission line, to communicate with the transmitter via the transmission line.

6. The system according to claim 1, further comprising a transceiver, including the transmitter, to enable bidirectional communication over the elongated transmission line between the transceiver and at least one other communications endpoint.

7. The system according to claim 1, wherein alignment and proximity between one of the transmission line couplers and the transmitter coupler is sufficient to establish near-field contactless communications between the elongated transmission line and the transmitter coupler.

8. The system according to claim 1, further comprising:
    a plurality of modules, each of the modules comprising:
        a respective battery;
        a respective transmitter to receive electrical power from the battery and to transmit a radio frequency signal that includes battery information; and
        a respective transmitter coupler on an outer surface of the module, the transmitter coupler electrically connected with the transmitter and aligned to contactlessly couple with a respective one of the transmission line couplers to provide a contactless communication link between the respective transmitter and the elongated transmission line.

9. The system according to claim 8, wherein: each of the plurality of modules further comprises a respective detector to detect information associated with the respective battery thereof; and the transmitter is arranged to transmit the detected information via the elongated transmission line, the detected information including an identity of the battery and/or an operating parameter of the battery.

10. The system according to claim 8, wherein the elongated transmission line further comprises:
    an elongated sheet of a flexible or semi-flexible substrate on a surface of the module; and
    electrical traces on the elongated sheet in an arrangement to provide the transmission line couplers and electrical connections between adjacent pairs of the transmission line couplers.

11. A method of communicating battery information, the method comprising:
    positioning an elongated transmission line along a surface of a module to align a given transmission line coupler with a transmitter coupler on the surface of the module, the transmission line including an arrangement of transmission line couplers, including the given transmission line coupler, distributed along its length at spaced apart locations, the module including a battery and a transmitter, the transmitter being electrically connected to the transmitter coupler;
    establishing a communication link between the transmitter and the elongated transmission line via a contactless link formed by the alignment of the transmission line coupler and the transmitter coupler;
    transmitting information associated with the battery from the transmitter via the established communications link;
    aligning a termination coupler of the elongated transmission line with a termination coupler of another elongated transmission line to contactlessly couple the elongated transmission lines;
    coupling a host module to the other elongated transmission line; and
    transmitting information associated with the battery from the transmitter to the host module via a communications path that includes the elongated transmission lines.

12. The method according to claim 11, further comprising:
    detecting, via at least one sensor, information associated with the battery; and
    transmitting information, including the detected information, from the transmitter via the elongated transmission line.

13. The method according to claim 12, wherein the transmitted information includes at least one of charge, pressure, identity and temperature of the battery.

14. The method of communicating battery information according to claim 11, wherein the transmitter is part of a transceiver, the method further comprising: receiving, at a receiver of the transceiver, information from the host module via the communication path.

* * * * *